UNITED STATES PATENT OFFICE.

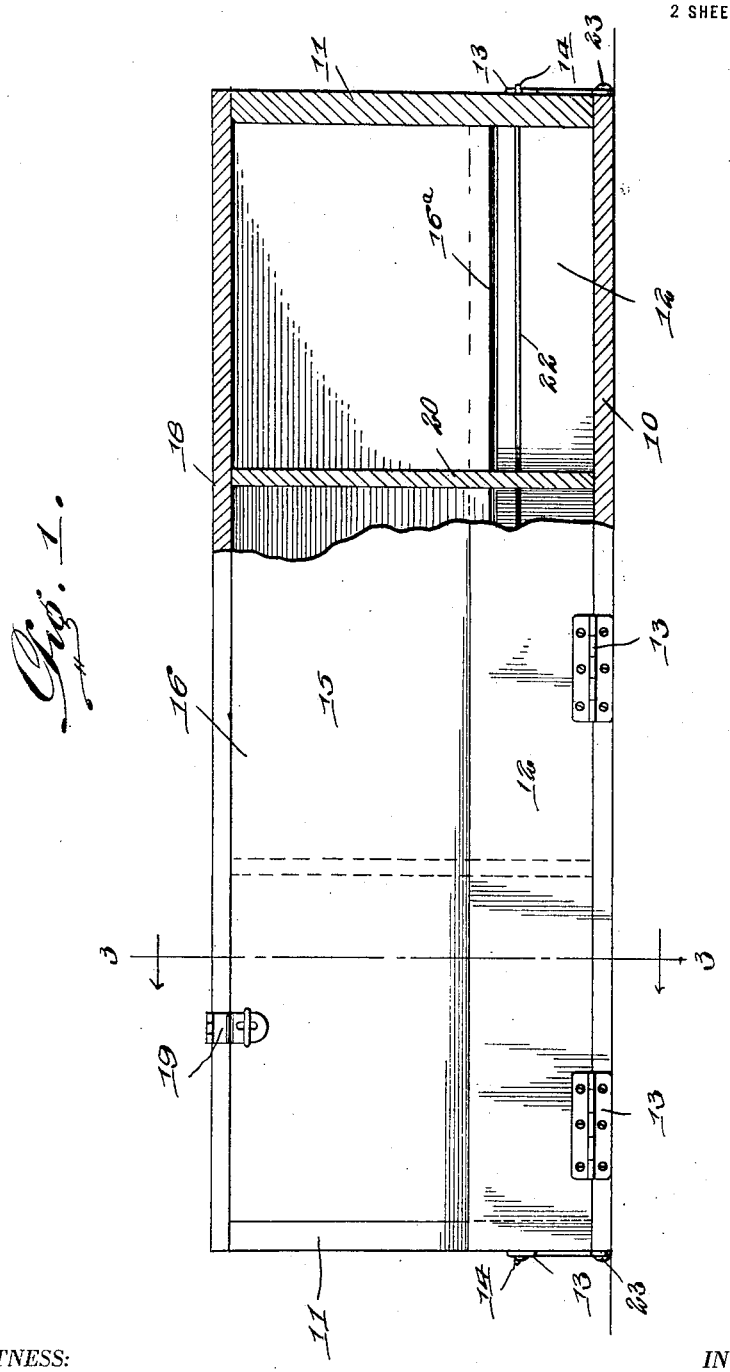

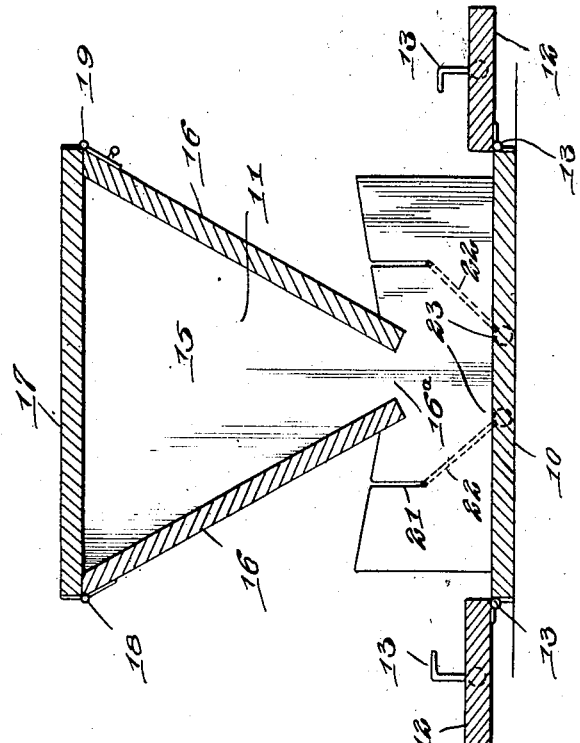

DAVID McCOARD, OF ELMER, OKLAHOMA.

POULTRY-FEEDER.

1,370,466.      Specification of Letters Patent.      Patented Mar. 1, 1921.

Application filed December 5, 1919. Serial No. 342,701.

*To all whom it may concern:*

Be it known that I, DAVID McCOARD, a citizen of the United States, residing at Elmer, in the county of Jackson and State of Oklahoma, have invented new and useful Improvements in Poultry-Feeders, of which the following is a specification.

The object of the invention is to provide a simple and efficient poultry feeding apparatus designed to prevent waste of the feed, protection of the fowl while feeding, the maximum capacity for the accommodation of the fowls relative to the size of the apparatus, and facility in cleaning the same interiorly to prevent the objectionable accumulation of filth.

With these and related objects in view the invention consists in a construction and combination of parts of which a preferred embodiment is illustrated in the accompanying drawings, wherein:—

Figure 1 is a side view partly in section of the improved feeder.

Fig. 2 is an end view of the same.

Fig. 3 is a transverse section on the plane indicated by the line 3—3 of Fig. 1 showing the side walls of the trough released and opened outward to give access to the interior of the trough for cleaning purposes.

The base 10 forms the bottom of a trough having the end walls 11 and side walls 12, the latter being hinged as at 13 to the base or bottom to permit of their being folded out into a horizontal position as indicated in Fig. 3 to give access to the interior of the trough for cleaning purposes, and adapted to be held in their normal or closed positions by means of hooks 13 engaging keepers 14 on the end walls.

Sustained above the trough is a hopper 15 having an outlet throat 15ª preferably arranged above the longitudinal center of the trough, so that the latter is accessible from either side and also from the ends to fowl seeking the food, said hopper being upwardly expanded or provided with upwardly divergent side walls 16 which overhang the trough and thus protect the contents of the latter and serve as shelters for the poultry while feeding. The hopper is preferably provided with a lid or cover 17 which is hinged as at 18 to permit of filling the hopper, a suitable fastening device 19 being arranged at the free edge of the cover so that it may be locked to prevent waste of the contents thereof in the event that the feeder should be overturned.

It will be obvious that the interior of the hopper may be divided into any desired number of compartments by means of transverse partitions 20 and extending longitudinally of the trough between the lower edges of the side walls of the hopper and the side walls 12 of the trough are guard wires 22 seated in slots or slits 21 cut in the end walls of the trough, the extremities of said wires being secured as at 23 by any suitable fastening means to the end that the wires may be maintained in a taut condition to serve as a means of preventing the poultry from entering the trough and also scratching or dragging the grain out of the trough and thus involving waste.

It will be observed that the device as described is of simple construction and may be composed of material which at the saw mills is ordinarily regarded as waste.

What is claimed is:—

A poultry feeder comprising a trough having rigid ends and hinged sides, means normally holding said sides in upright position, said sides being swingable to lie horizontally, a hopper disposed above said trough and having inclined sides, said hopper extending beyond the sides of the trough whereby to form a shelter, and means within the trough for preventing poultry from entering or scratching, said means comprising a taut wire extending longitudinally of the trough at each side of the hopper, the wire having its ends secured externally upon the ends of the trough and the trough having its ends provided with slits extending downwardly from the upper edges within which said wires are received.

In testimony whereof I affix my signature.

DAVID McCOARD.